United States Patent
Buch et al.

(10) Patent No.: US 12,079,508 B2
(45) Date of Patent: Sep. 3, 2024

(54) EFFICIENT ERROR SIGNALING BY MEMORY

(71) Applicant: Micron Technology, Inc., Boise, ID (US)

(72) Inventors: Steffen Buch, Munich (DE); Thomas Hein, Munich (DE)

(73) Assignee: Micron Technology, Inc., Boise, ID (US)

( * ) Notice: Subject to any disclaimer, the term of this patent is extended or adjusted under 35 U.S.C. 154(b) by 30 days.

(21) Appl. No.: 17/868,041

(22) Filed: Jul. 19, 2022

(65) Prior Publication Data
US 2024/0028247 A1    Jan. 25, 2024

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
USPC ...................................................... 711/154
See application file for complete search history.

(56) References Cited

U.S. PATENT DOCUMENTS

| | | | | |
|---|---|---|---|---|
| 10,964,406 | B2* | 3/2021 | Song | G11C 29/04 |
| 2017/0344422 | A1* | 11/2017 | Kwon | G11C 29/52 |
| 2019/0312601 | A1* | 10/2019 | Kern | G06F 11/1004 |

FOREIGN PATENT DOCUMENTS

JP    7057860 B2 *    4/2022    .......... G06F 11/1008

* cited by examiner

*Primary Examiner* — Mardochee Chery
(74) *Attorney, Agent, or Firm* — Holland & Hart LLP

(57) ABSTRACT

Methods, systems, and devices for efficient error signaling by memory are described. When executing a read operation, a memory device may perform an error control operation to detect errors in data associated with the read operation and transmit signaling indicating the data. The memory device may transmit signaling indicating a first or second value of an indicator of a combination error: the first value indicating that an error was detected in the data during the error control operation or a non-driven condition for transmitting the signaling indicating the data, and the second value indicating that no errors were detected in the data during the error control operation and that the read operation has been executed. The memory device may additionally store a value in a register indicating whether an indicated combination error corresponds to errors being detected in the data, a non-driven condition, or both.

25 Claims, 8 Drawing Sheets

EFFICIENT ERROR SIGNALING BY MEMORY

FIELD OF TECHNOLOGY

The following relates to one or more systems for memory, including efficient error signaling by memory.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read (e.g., sense, detect, retrieve, identify, determine, evaluate) a stored state in the memory device. To store information, a component may write (e.g., program, set, assign) the state in the memory device.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
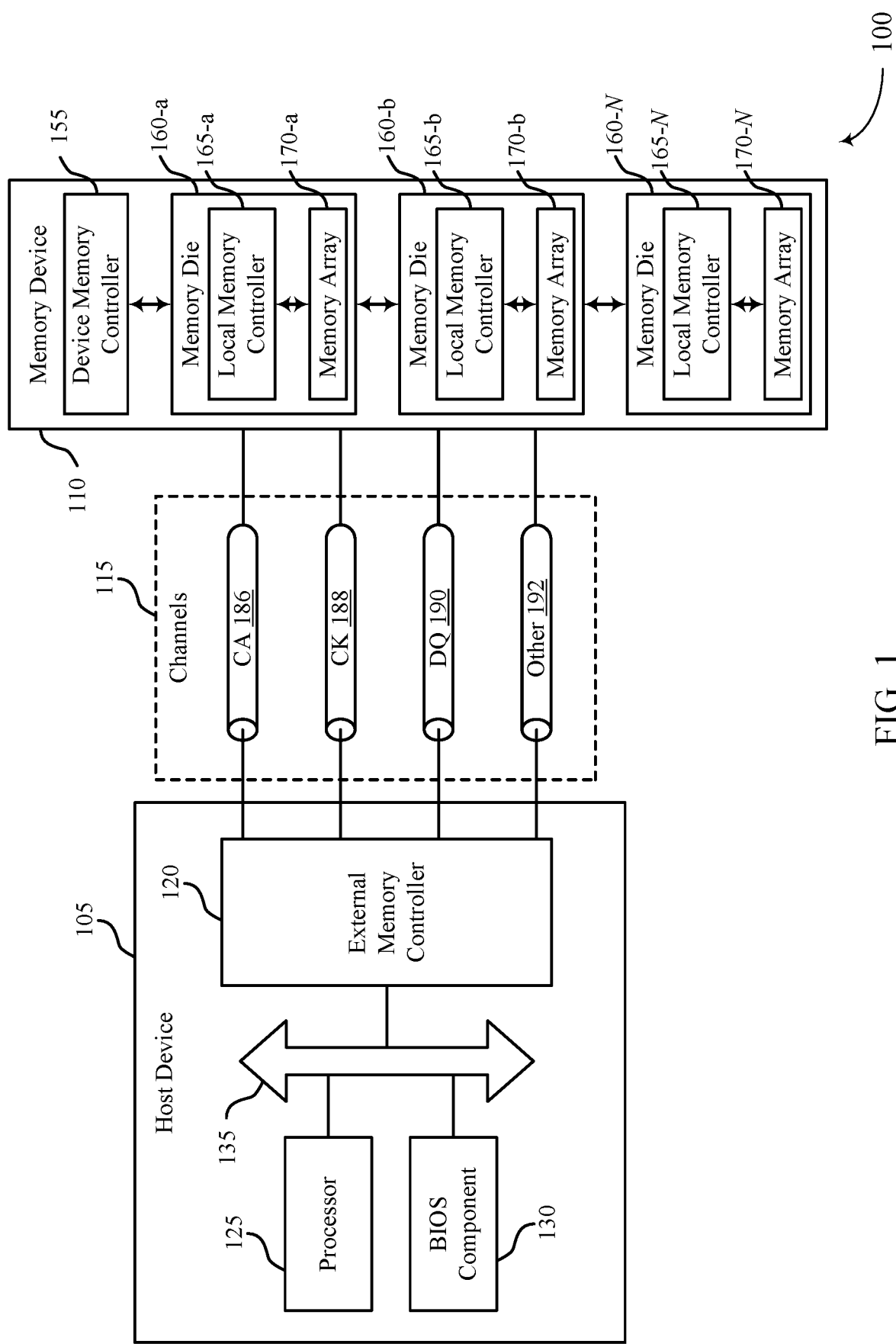
FIG. 1 illustrates an example of a system that supports efficient error signaling by memory in accordance with examples as disclosed herein.

Some memory devices may include circuitry configured to detect errors associated with various operations or various components of the memory device. For example, a memory device may include error control circuitry configured to detect errors in data associated with a read operation. Traditionally, such memory devices may be configured to drive first signaling to indicate error states of data associated with the read operation. For example, the memory device may output a first value to indicate that one or more errors are detected in the data associated with the read operation, and may drive a second value to indicate that no errors are detected in the data associated with the read operation. That is, a pin may be driven to a value (e.g., to a high value or asserted to a "1" state, e.g., to a low value or asserted to a "0" state) upon detection of one or more errors in the data associated with the read operation. The pin may be driven to the value during one or more output cycles (e.g., data output cycles). However, any faults or errors associated with voltage supplies, clock signals, reset signals, or the like may result in the memory device being at least temporarily unable to actively drive one or more pins (e.g., data pins) to transmit signaling to a host device. In some cases, the memory device may additionally be configured to assert or drive a pin (e.g., the same pin, a different pin) using second signaling to indicate whether the memory device detects a normal condition (e.g., a valid condition for an operation associated with a command) or a non-driven condition of one or more circuits including circuits asserting the register or pin. Accordingly, the memory device may output one value to indicate when a normal or valid condition exists and may output another value to indicate when a non-driven condition exists to increase the overall reliability and safety of the memory device.

The techniques as described herein provide for the memory device to include a single indication of a combination error that indicates whether errors are detected in data associated with a read operation and whether the memory device detects a non-driven condition. For example, the memory device may transmit signaling including an indicator of the combination error that has two values (e.g., a low value "0" or a high value "1"). In some cases, a first value (e.g., associated with the memory device driving a first value) of the combination error indicator may indicate that one or more errors are detected in the data during the error control operation, a non-driven condition, or both. Additionally, a second value (e.g., associated with the memory device driving the second value) of the combination error indicator may indicate that no errors are detected in the data during the error control operation and an absence of the non-driven condition (e.g., the memory device detects a normal and valid condition). In some cases, to indicate a presence of a combination error, the memory device may drive a pin of the memory device to a value that is associated with a termination of the pin. For example, in cases that the pin is associated with a high termination voltage, the memory device may indicate a presence of the combination error by driving the pin of the memory device to the high value (e.g., a "1"). Additionally, in cases that the pin is associated with a low termination voltage, the memory device may indicate a presence of the combination error by driving the pin of the memory device to the low value (e.g., a "0"). Thus, in cases that a non-driven condition exists, the voltage on the pin may be terminated to a value (e.g., a high termination voltage, a low termination voltage) that indicates the presence of a combination error, which in turn indicates a presence of the non-driven condition.

Features of the disclosure are initially described in the context of systems and dies as described with reference to FIGS. 1 through 3. Features of the disclosure are described in the context of timing diagrams as described with reference to FIGS. 4A and 4B. These and other features of the disclosure are further illustrated by and described with reference to an apparatus diagram and flowcharts that relate to efficient error signaling by memory as described with reference to FIGS. 5 through 8.

FIG. 1 illustrates an example of a system 100 that supports efficient error signaling by memory in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system 100 that is operable to store data for one or more other components of the system 100.

Portions of the system 100 may be examples of the host device 105. The host device 105 may be an example of a processor (e.g., circuitry, processing circuitry, a processing component) within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or any combination thereof that implements the functions of an external memory controller 120. In some examples, the external memory controller 120 may be referred to as a host (e.g., host device 105).

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other functions.

The memory device 110 may be operable to store data for the components of the host device 105. In some examples, the memory device 110 (e.g., operating as a secondary-type device to the host device 105, operating as a dependent-type device to the host device 105) may respond to and execute commands provided by the host device 105 through the external memory controller 120. Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide functionality (e.g., control functionality) for the system 100 or the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include instructions (e.g., a program, software) stored in one or more of read-only memory (ROM), flash memory, or other non-volatile memory.

The memory device 110 may include a device memory controller 155 and one or more memory dies 160 (e.g., memory chips) to support a capacity (e.g., a desired capacity, a specified capacity) for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store one or more bits of data. A memory device 110 including two or more memory dies 160 may be referred to as a multi-die memory or a multi-die package or a multi-chip memory or a multi-chip package.

The device memory controller 155 may include components (e.g., circuitry, logic) operable to control operation of the memory device 110. The device memory controller 155 may include hardware, firmware, or instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

A local memory controller 165 (e.g., local to a memory die 160) may include components (e.g., circuitry, logic) operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or any combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other components operable for supporting described operations of the device memory controller 155 or local memory controller 165 or both.

The external memory controller 120 may be operable to enable communication of information (e.g., data, commands, or both) between components of the system 100 (e.g., between components of the host device 105, such as the processor 125, and the memory device 110). The external memory controller 120 may process (e.g., convert, translate) communications exchanged between the components of the host device 105 and the memory device 110. In some examples, the external memory controller 120, or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be an example of a transmission medium that carries information between the host device 105 and the memory device 110. Each channel 115 may include one or more signal paths (e.g., a transmission medium, a conductor) between terminals associated with the components of the system 100. A signal path may be an example of a conductive path operable to carry a signal. For example, a channel 115 may be associated with a first terminal (e.g., including one or more pins, including one or more pads) at the host device 105 and a second terminal at the memory device 110. A terminal may be an example of a conductive input or output point of a device of the system 100, and a terminal may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or any combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths (e.g., eight or nine signal paths) to communicate control information (e.g., commands or addresses).

In some examples, data channels 190 may be operable to communicate information (e.g., data, control information) between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths. For example, some memory devices 110 may transmit signaling indicating errors associated with a read operation based on, for example, vendor-specific errors or faults. That is, the memory device 110 may transmit signaling indicating a master error flag that may indicate one or more errors that may impact a reliability of data associated with a read operation (e.g., one or more fuses associated with the memory device 110 not loaded successfully, an improper execution of a previously-performed reset operation).

Additionally, the memory device 110 may include circuitry configured to detect errors in data associated with a read operation. Here, the memory device 110 may transmit, to the host device 105, error control information corresponding to the data associated with the read operation via the EDC channel or, in some cases, via another channel such as the data channel 190. In some cases, error control information corresponding to data associated with a read operation transmitted to the host device 105 may correspond to link error control information (e.g., link error detection and correction codes), which may enable the host device 105 to detect, and in some cases correct, link faults (e.g., errors introduced in the data based on transmitting signaling between the memory device 110 and the host device 105). Upon receiving the link error control information and the data associated with the read operation, the host device 105 may perform an error control operation to detect, and in some cases correct, errors in the data received from the memory device 110.

Additionally, or alternatively, memory devices 110 that include error control circuitry may be configured to indicate, to the host device 105 as part of a read operation, whether the memory device 110 detects errors in data associated with a read operation (e.g., via a data error flag). That is, the memory device 110 may execute an error control operation to detect, and in some cases correct, errors detected in the data stored at the memory device 110 prior to transmitting signaling to the host device 105 indicating the data associated with the read operation. In some cases, performing an error control operation on the data stored at the memory device 110 (e.g., within one of the memory arrays 170) may enable the memory device 110 to detect, and in some cases correct, memory array faults (e.g., errors introduced in the data based on writing, storing, or detecting the data in a memory array 170 of the memory device 110). For example, the memory device 110 may drive a first value (e.g., a high value, a "1") on a pin associated with an EDC channel or a pin associated with the data channel 190 to transmit signaling indicating that one or more errors are detected in the data associated with the read operation, and may drive a second value (e.g., a low value, a "0") on the EDC channel or the data channel 190 to transmit signaling indicating that no error are detected in the data associated with the read operation.

However, any faults or errors associated with voltage supplies, clock signals, reset signals, or the like may result in the memory device 110 being at least temporarily unable to actively drive certain values on the channels 115, which may correspond to a non-driven condition at the memory device 110. For example, in the case of a non-driven condition, the memory device 110 may be unable to correctly drive a pin associated with the data channel 190 to indicate the data associated with the read operation. In another example, the memory device 110 may be unable to correctly drive a pin to transmit signaling indicating whether errors are detected in the data associated with the read operation in the case of a non-driven condition.

In some cases, the memory device 110 may additionally be configured to assert or drive a pin (e.g., a pin associated with one of the channels 115, another pin not associated with one of the channels 115 such as a direct memory interface (DMI) pin) upon detection of a normal or valid condition (e.g., instead of the non-driven condition) of one or more circuits including circuits asserting the register or pin (e.g., via a valid read operation flag). Accordingly, the memory device 110 may drive one value on a channel 115 to transmit signaling indicating when a normal or valid condition exists and may drive another value on the channel 115 to transmit signaling indicating when a non-driven condition exists, which may increase the overall reliability and safety of the memory device 110.

In some cases, transmitting first signaling indicating whether one or more errors are detected in data associated with a read operation and transmitting second signaling indicating whether the memory device 110 detects a normal and valid condition, or a non-driven condition may result in a quantity of signaling overhead of the memory device 110 executing the read operation. For example, the memory device 110 may rely on one or more clock cycles to drive a pin to a value indicating whether one or more errors are detected in data associated with the read operation. The memory device 110 may additionally rely on one or more additional clock cycles to drive the pin to a value indicating whether the memory device 110 detects a normal and valid condition or a non-driven condition. To increase reliability of the signaling, more than one clock cycle may be used for each indication. That is, the memory device 110 may rely on at least two clock cycles to indicate both, and a quantity of clock cycles for the signaling may increase at twice the rate of the redundancy for each indication. Thus, the memory device 110 may rely on two or more clock cycles to indicate whether errors are detected in data associated with a read operation and to indicate whether the memory device 110 detects a non-driven condition.

Techniques described herein provide for the memory device 110 to include a single indication of a combination error that indicates whether errors are detected in data associated with a read operation and whether the memory device 110 detects a non-driven condition. For example, the memory device 110 may transmit signaling including an indicator of the combination error that has two values (e.g., a low value "0" or a high value "1"). In some cases, a first value (e.g., associated with the memory device 110 driving a first value) of the combination error indicator may indicate that one or more errors are detected in the data during the error control operation, a non-driven condition, or both. Additionally, a second value (e.g., associated with the memory device 110 driving the second value) of the combination error indicator may indicate that no errors are detected in the data during the error control operation and an absence of the non-driven condition (e.g., the memory device 110 detects a normal and valid condition). In some cases, to indicate a presence of a combination error, the memory device 110 may drive a pin of the memory device 110 to a value that is associated with a termination of the pin. For example, in cases that the pin is associated with a high termination voltage, the memory device 110 may indicate a presence of the combination error by driving the pin of the memory device 110 to the high value (e.g., a "1"). Additionally, in cases that the pin is associated with a low termination voltage, the memory device 110 may indicate a presence of the combination error by driving the pin of the memory device 110 to the low value (e.g., a "0"). Thus, in cases that a non-driven condition exists, the voltage on the pin may be terminated to a value (e.g., a high termination voltage, a low termination voltage) that indicates the presence of a combination error, which in turn indicates a presence of the non-driven condition.

Additionally, the memory device 110 may store a value in a register indicating details about the detected combination error. For example, the memory device 110 may store a first value in the register in cases that the detected combination error corresponds to one or more errors being detected in the data during the read operation and a non-driven condition. Additionally, the memory device 110 may store a second value in the register in cases that the detected combination error corresponds to one or more errors being detected in the data and a normal or valid existing (e.g., the read operation has been executed). Further, the memory device 110 may store a third value in the register in cases that the detected combination error corresponds an absence of detected errors in the data and a non-driven condition. Here, if the host device 105 receives an indication of a combination error from the memory device 110 (e.g., based on detecting that one of the channels 115 is driven to a value indicating the combination error), the host device 105 may poll the register at the memory device 110 to determine whether the combination error corresponds to one or more errors being detected in the data during the error control operation, the non-driven condition, or both.

Figure 2:
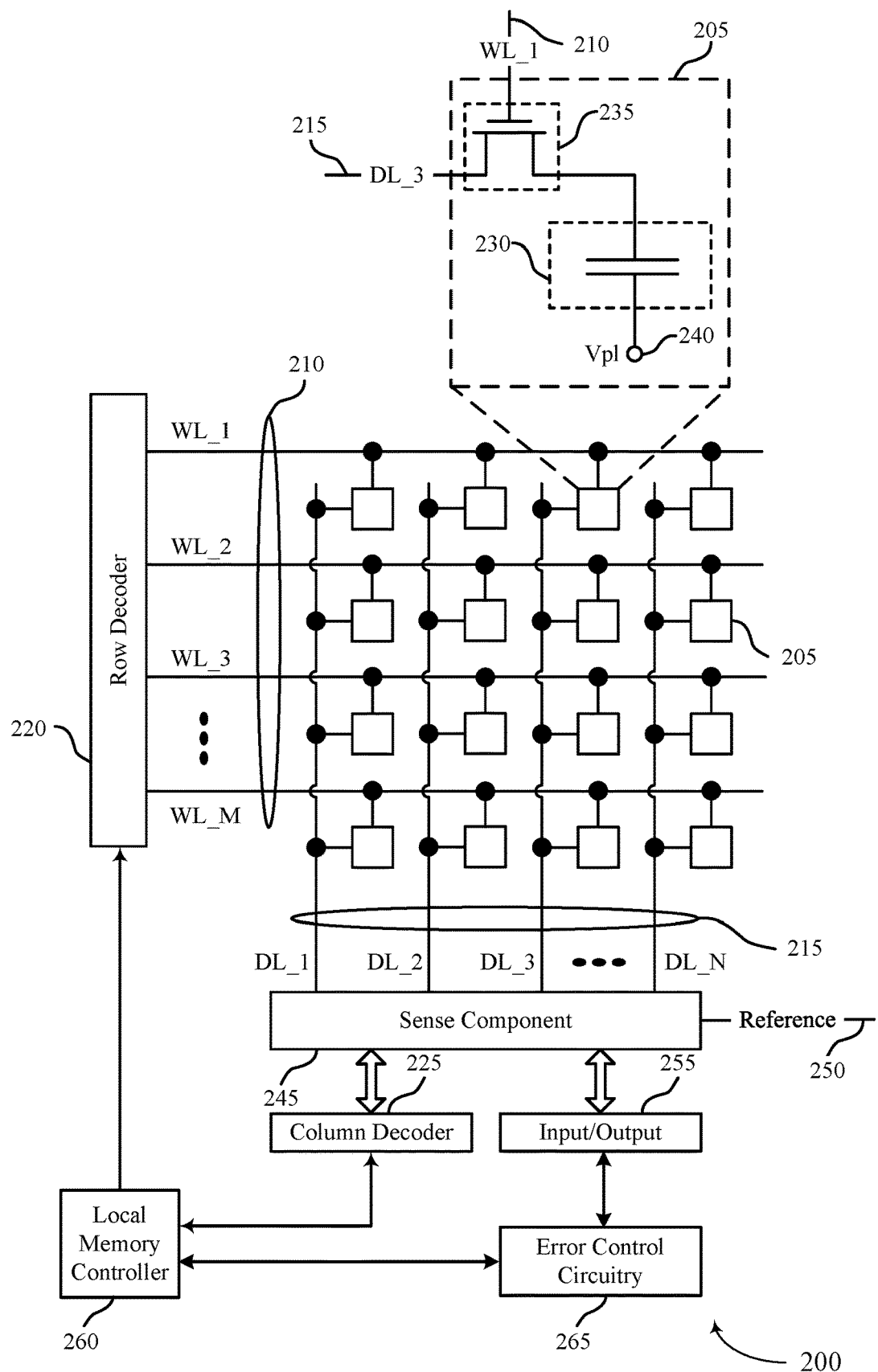
FIG. 2 illustrates an example of a memory die that supports efficient error signaling by memory in accordance with examples as disclosed herein.

FIG. 2 illustrates an example of a memory die 200 that supports efficient error signaling by memory in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

In some examples, a memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235 (e.g., a cell selection component). The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include access lines (e.g., word lines 210, digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding. Memory cells 205 may be positioned at intersections of the word lines 210 and the digit lines 215.

Operations such as reading and writing may be performed on the memory cells 205 by activating access lines such as a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in a two-dimensional or in a three-dimensional configuration may be referred to as an address of a memory cell 205. Activating a word line 210 or a digit line 215 may include applying a voltage to the respective line.

Accessing the memory cells 205 may be controlled through a row decoder 220, or a column decoder 225, or any combination thereof. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device (e.g., a memory device 110) that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host (e.g., a host device 105) based on performing the one or more operations. The local memory controller 260 may generate row signals and column address signals to activate the target word line 210 and the target digit line 215. The local memory controller 260 also may generate and control various signals (e.g., voltages, currents) used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a read operation (e.g., a sense operation) on one or more memory cells 205 of the memory die 200. During a read operation, the state (e.g., logic state, charge state) stored in a memory cell 205 of the memory die 200 may be evaluated (e.g., read, determined, identified). The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal (e.g., charge, voltage) to the sense component 245 in response to biasing the access lines. The sense component 245 may amplify the signal. The local memory controller 260 may activate the sense component 245 (e.g., latch the sense component) and compare the signal received from the memory cell 205 to a reference (e.g., the reference 250). Based on that comparison, the sense component 245 may determine a logic state that is stored on the memory cell 205.

The error control circuitry 265 may perform one or more error control operations on data. That is, the error control circuitry 265 may include error detection logic or may cause error detection logic (not shown) to perform the error control operations described herein. The error control circuitry 265 may perform one or more error control operations on data received from the host device as part of a write operation. For example, the error control circuitry 265 may receive data from the host device as part of a write operation. The error control circuitry 265 may determine or generate error control information associated with the data. The error control circuitry 265 may cause the data and the error control information to be stored in one or more memory cells 205 as part of the write operation. Additionally, the error control circuitry 265 may receive data and associated error control information from the memory die 200 as part of a read operation. The error control circuitry 265 may perform an error control operation based on the data and the error control information. For example, the error control circuitry 265 may perform an error control operation (e.g., a single error correction (SEC) error control operation, a SEC double error detection (SECDED) error control operation) to detect errors in the data, correct errors in the data, or both.

After performing the error control operation as part of the read operation, the error control circuitry 265 may output, to the local memory controller 260, the data associated with the read operation. Additionally, the error control circuitry 265 may output, to the local memory controller 260, an indication of whether one or more errors are detected in the data associated with the read operation and the data. The local memory controller 260 (or a device memory controller as described with reference to FIG. 1) may transmit signaling (e.g., via a data channel as described with reference to FIG. 1) to a host device indicating that data associated with the read operation. Additionally, the local memory controller 260 may transmit signaling (e.g., via the data channel, via another channel or pin as described with reference to FIG. 1), to the host device including an indicator of a combination error. Additionally, or alternatively, the local memory controller 260 may output signaling to another controller at the memory device (e.g., a device memory controller as described with reference to FIG. 1) including an indicator of the combination error, an indicator of whether the error control circuitry 265 detected any errors in the data associated with the read operation, or both.

For example, in cases that the error control circuitry 265 detects one or more errors in the data associated with the read operation or in cases that the local memory controller 260 detects a non-driven condition associated with transmitting the signaling indicating the data associated with the read operation, the local memory controller 260 may transmit signaling to the host device indicating a presence of a combination error associated with the read operation. Additionally, in cases that the error control circuitry 265 does not detect any errors in the data associated with the read operation and the local memory controller 260 does not detect a non-driven condition associated with transmitting the signaling indicating the data associated with the read operation (e.g., the local memory controller 260 determines that the read operation has been executed), the local memory controller 260 may transmit signaling to the host device indicating an absence of a combination error associated with the read operation.

Figure 3:
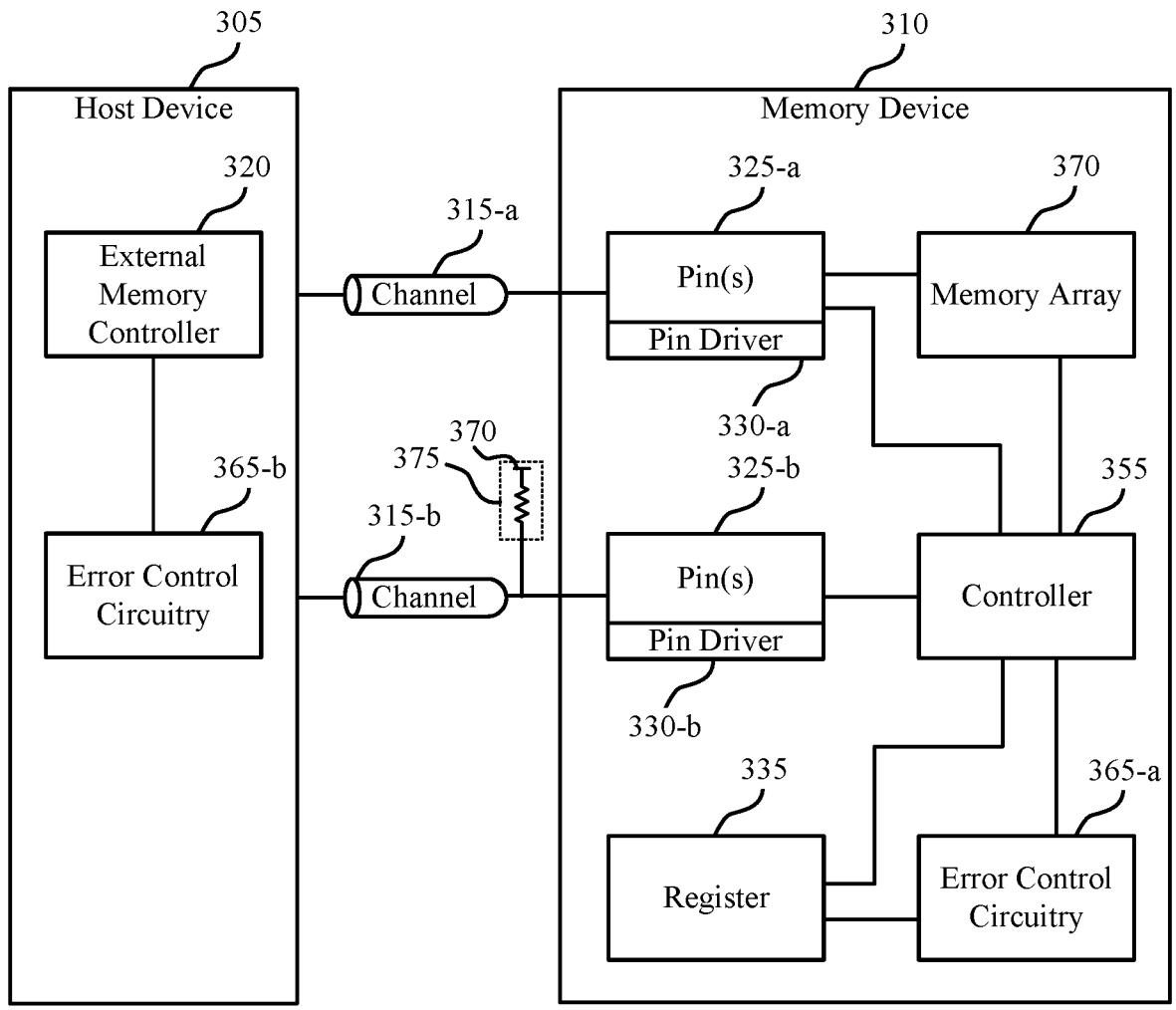
FIG. 3 illustrates an example of a system that supports efficient error signaling by memory in accordance with examples as disclosed herein.

FIG. 3 illustrates an example of a system 300 that supports efficient error signaling by memory in accordance with examples as disclosed herein. The system 300 may be an example of the system as described with reference to FIGS. 1 and 2. For example, the system 300 may include a host device 305, a memory device 310, an external memory controller 320, and channels 315, which may be respective examples of a host device, memory device, external memory controller, and channels, as described with reference to FIG. 1. Additionally, the memory device 310 may include a memory array 370, a controller 355, and error control circuitry 365-a, which be examples of memory arrays, controllers (e.g., local memory controllers, device memory controllers), and error control circuitry as described with reference to FIGS. 1 and 2. The memory device 310 may additionally include pins 325, pin drivers 330, and a register 335, and the host device 305 may additionally include error control circuitry 365-b.

The system 300 may additionally include pins 325 that are coupled with a pin driver 330. The pin driver 330 may include components (e.g., transistors) that are configured to couple any combination of pins 325 to the positive bias or the negative bias. For example, the pin driver 330 may be configured to drive one or more pins 325 from an idle state to a first value (e.g., a high value, a "1") or a second value (e.g., a low value, a "0") based on an input from the controller 355 (e.g., based on inputs from the memory array 370, the error control circuitry 365-a, or the register 335). For example, to drive a pin 325 to the first value, the corresponding pin driver 330 may couple the pin 325 (e.g., via a switch or transistor) to a positive bias. Additionally, to drive the pin 325 to the second value, the pin driver 330 may couple the pin 325 (e.g., via a switch or transistor) to a negative (e.g., ground) bias. In some examples, the pins 325 may be electrical contacts that are associated with a channel 315 between the memory device 310 and the host device 305. For example, the pin 325-a may be associated with the channel 315-a and the pin 325-b may be associated with the channel 315-b. Additionally or alternatively, the pin(s) 325 may correspond to a DMI pin.

In some examples, one or more pins 325 may be associated with a termination voltage 370. For example, a pin 325 may be coupled with a signal trace (not shown) and the signal trace may be coupled with a termination circuit 375 (e.g., a resistor that may in turn be coupled with one of negative bias or a positive bias, which may correspond to the termination voltage of the pin 325). In some cases, when the memory device 310 detects a non-driven condition, the pin 325 may be coupled with the termination voltage 370 of the pin 325. For example, if the pin 325-a is associated with a high termination voltage, during a non-driven condition, the pin 325-a may be coupled with the high termination voltage (e.g., a voltage source at the memory device 310, an external voltage source at the system 300). Thus, during the non-driven condition, the host device 305 may receive signaling via the channel 315-a corresponding to the termination voltage level of the pin 325-a (e.g., the high termination voltage level). In another example, if the pin 325-b is associated with a low termination voltage, during a non-driven condition, the pin 325-b may be coupled with a negative input voltage or a ground voltage source. Thus, during the non-driven condition, the host device 305 may receive signaling via the channel 315-b corresponding to the termination voltage level of the pin 325-b (e.g., the low termination voltage level). Although illustrated as coupled with a signal trace, in some cases the termination circuit 375 may be internal to the memory device 310. In some cases, the termination voltage 370 may be selectable (e.g., between a negative bias and a positive bias using a fuse), and the state of the pin 325-*a* associated with the non-driven condition may be set by the selected termination voltage 370.

To initiate a read operation, the host device 305 may transmit a read command to the memory device 310. For example, the external memory controller 320 may transmit, via a channel 315 such as a CA channel, signaling to the memory device 310 indicating a read command. Upon receiving the read command from the host device 305, the memory device 310 may initiate a read operation at an address of the memory array 370 indicated by the received read command. Based on accessing the address of the memory array 370 indicated by the received read command, the memory device 310 may transfer the data stored at the address to the error control circuitry 365-*a*. Additionally, the memory array 370 may output error control information corresponding to the data associated with the read operation to the error control circuitry 365-*a*.

The error control circuitry 365-*a* may perform an error control operation based on error control information and data received from the memory array 370. Based on performing the error control operation, the error control circuitry 365-*a* may detect, and in some cases correct, one or more errors in the data received from the memory array 370 (e.g., that is associated with the read operation). Then, the error control circuitry 365-*a* may output, to the controller 355, the data, error control information, and an indication of whether the error control circuitry 365-*a* detected any errors in the data received from the memory array 370.

The memory device 310 may transmit signaling to the host device 305 indicating the data associated with the read operation (e.g., read from the memory array 370 and received by the controller 355 from the error control circuitry 365-*a*). For example, in cases that the channel 315-*a* corresponds to a data channel, the pin driver 330-*a* may drive the pin(s) 325-*a* to voltage levels indicating the data associated with the read operation. In cases of a normal or valid condition at the memory device 310, the pin driver 330-*a* may couple the pin(s) 325-*a* with a termination voltage and another voltage source (e.g., different from the termination voltage) to transmit signaling indicating the data associated with the read operation to the host device 305 via the channel 315-*a*. Additionally, in cases of a non-driven condition, the pin driver 330-*a* may be unable to couple the pin(s) 325-*a* with a voltage source other than the termination voltage source associated with the pin(s) 325-*a*. Thus, the host device 305 may receive signaling that fails to indicate the data associated with the read operation.

Additionally, the memory device 310 may transmit, to the host device 305, signaling indicating error control information corresponding to the data associated with the read command (e.g., generated by the error control circuitry 365-*a*). For example, the memory device 310 may transmit the error control information via the same pin(s) 325-*a* for transmitting the data. Additionally, or alternatively, the memory device 310 may transmit the error control information via other pin(s) 325-*b* (e.g., associated with another channel 315-*b*). Upon receiving the data and the error control information associated with the data, the error control circuitry 365-*b* may execute an error control operation using the error control information to detect, and in some cases correct, errors in the data received from the memory device 310 as part of the read operation. In some cases, this error control operation may correspond to a link error control operation.

In addition to transmitting signaling to the host device 305 indicating the data associated with the read operation, the memory device 310 may transmit signaling including an indicator of a combination error to the host device 305. In some cases the memory device 310 may transmit the signaling including the indicator of the combination error to the host device 305 via the same pin 325-*a* that the memory device 310 transmits the data associated with the read operation. In some other cases, the memory device 310 may transmit the signaling including the indicator of the combination error to the host device 305 via a different pin 325-*b* (e.g., different from the pin 325-*a* relied upon by the memory device 310 to transmit the data associated with the read operation). To transmit signaling to the host device 305 indicating a presence of a combination error to the host device 305, the memory device 310 may drive the pin(s) 325 (e.g., the pin(s) 325-*a* or the pin(s) 325-*b*) from a voltage level associated with an idle state to a voltage level corresponding to the termination voltage level of the pin(s) 325. Additionally, to transmit signaling to the host device 305 indicating an absence of a combination error to the host device 305, the memory device 310 may drive the pin(s) 325 from the voltage level associated with the idle state to a voltage level different from the termination voltage level of the pin(s) 325.

The indicator of the combination error may indicate either a presence of the combination error (e.g., via one value of the indicator) or an absence of the combination error (e.g., via another value of the indicator). The memory device 310 may detect a combination error associated with the read operation if one or more errors are detected in the data associated with the read operation (e.g., by the error control circuitry 365-*a*), if the memory device 310 detects a non-driven condition associated with transmitting the signaling to the host device 305 indicating the data associated with the read operation (e.g., at the pin(s) 325-*a*), or both. Additionally, the memory device 310 may detect an absence of a combination error if the error control circuitry 365-*a* does not detect errors in the data associated with the read operation and the memory device 310 does not detect a non-driven condition associated with transmitting the signaling to the host device 305 indicating the data associated with the read operation (e.g., via the pin(s) 325-*a*).

In cases that the memory device 310 detects a combination error associated with the read operation, the memory device 310 may store a value in the register indicating a type of the detected combination error. For example, in cases that the memory device 310 detects that the combination error corresponds to the error control circuitry 365-*a* detecting one or more errors in the data associated with the read operation and the memory device 310 detecting a non-driven condition associated with transmitting the signaling to the host device 305 indicating the data associated with the read command, the memory device 310 may store a first value in the register 335. Additionally, in cases that the memory device 310 detects that the combination error corresponds to the error control circuitry 365-*a* detecting one or more errors in the data associated with the read operation and an absence of a non-driven condition (e.g., the memory device 310 completes an execution of the read command by transmitting signaling to the host device 305 indicating the data associated with the read command without detecting a non-driven condition), the memory device 310 may store a second value (e.g., different from the first value) in the register 335. Additionally, in cases that the memory device 310 detects that the combination error corresponds to the error control circuitry 365-*a* not detecting any errors in the data associated with the read operation and the memory device 310 detecting a non-driven condition associated with transmitting the signaling to the host device 305 indicating the data associated with the read command, the memory device 310 may store a third value (e.g., different from the first value and the second value) in the register 335.

In cases that the host device 305 receives signaling from the memory device 310 indicating an absence of a combination error associated with the read operation, the host device 305 may determine that the memory device 310 has executed the read command. Additionally, in cases that the host device 305 receives signaling from the memory device 310 indicating a presence of a combination error associated with the read operation, the host device 305 may read the register 335 to determine a type of the combination error. For example, the host device 305 may read the register to determine whether the value stored in the register indicates that the combination error corresponds to one or more errors detected in the data associated with the read command (e.g., by the error control circuitry 365-*a*), a non-driven condition associated with the memory device 310 transmitting signaling indicating the data associated with the read command (e.g., at the pin(s) 325-*a*), or both.

Figure 4:
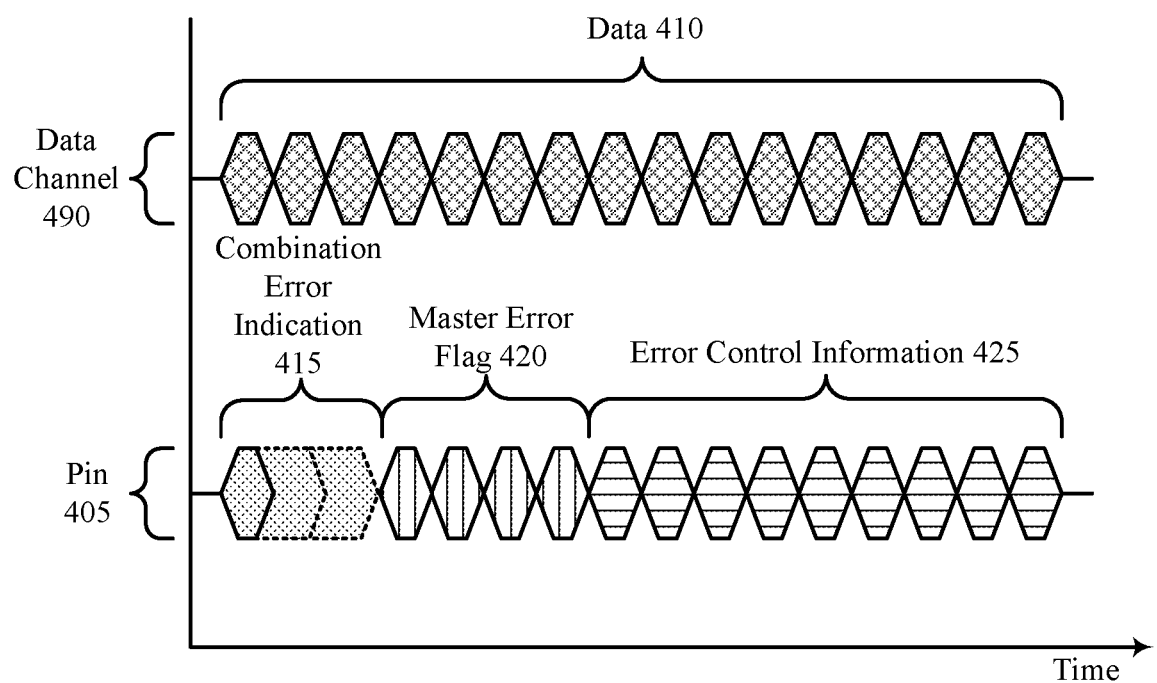
FIG. 4 illustrates an example of a timing diagram that supports efficient error signaling by memory in accordance with examples as disclosed herein.

FIG. 4 illustrates an example of a timing diagram 400 that supports efficient error signaling by memory in accordance with examples as disclosed herein. A memory device, as described herein, may implement aspects of the timing diagram 400 during an executing of a read operation. For example, a memory device may be coupled with a host device via the data channel 490 and the pin 405, which may be examples of the data channels and pins as described with reference to FIGS. 1 through 3. Additionally, during an executing of a read operation, the memory device may transmit the data 410, combination error indication 415, a master error flag 420, and error control information 425, which may be examples of data, combination error indications, master error flags, and error control information as described herein.

In the example of the timing diagram 400, a memory device may receive a read command (e.g., from a host device) and access a memory array at the memory device to read the data indicated in the read command. Then, the memory device may perform an error control operation to detect one or more errors in the data associated with the read operation.

Based on reading the data and performing the error control operation, the memory device may transmit signaling to the host device in accordance with the timing diagram 400. For example, the memory device may transmit signaling (e.g., to a host device) indicating the data 410 associated with the read operation via a data channel 490. In some cases, the data channel 490 may be associated with one or more pins, which may include pin 405 or, in some other cases, may be distinct from the pin 405. To transmit the signaling indicating the data 410, the memory device may output one or more voltages on the data channel 490 by driving the one or more pins associated with the data channel 490. In cases of normal or valid conditions, the memory device may adjust the driven voltages of the pins associated with the data channel 490 to indicate the data 410 to the host device. Additionally, in cases of a non-driven condition, the memory device may be unable to adjust a driven voltage of one or more pins associated with the data channel 490. For example, during a non-driven condition, the memory device may output a voltage corresponding to a termination voltage of the one or more pins of the data channel 490, which may fail to indicate the data 410 to a host device.

Additionally, the memory device may transmit signaling indicating a combination error indication 415 via a pin 405. For example, the memory device may transmit the combination error indication 415 indicating a presence of a combination error if the memory device detects one or more errors in the error control operation, if the memory device detects a non-driven condition associated with the signaling indicating the data 410, or both. In cases that the memory device detects a combination error associated with the read operation, the memory device may transmit signaling including the combination error indication 415 (e.g., indicating a presence of a combination error) by applying a voltage associated with the termination voltage of the pin 405 to the pin 405. Additionally, in cases that the memory device does not detect any combination error associated with the read operation, the memory device may transmit signaling including the combination error indication 415 (e.g., indicating an absence of any combination error) by applying a voltage different from the termination voltage of the pin 405 to the pin 405.

The memory device may transmit the combination error indication 415 via a single cycle (e.g., a single clock cycle). For example, the memory device may drive the pin 405 to a voltage associated with the combination error indication 415 for a single cycle to indicate, to the host device, the presence or absence of the combination error associated with the read operation. In some cases (e.g., to increase a reliability of the signaling indicating the combination error indication 415), the memory device may transmit more than one repetition of the combination error indication 415. For example, the memory device may drive the pin 405 to the voltage associated with the combination error indication 415 for more than one cycle to indicate, to the host device, the presence of absence of the combination error associated with read operation. While the timing diagram 400 illustrates the memory device transmitting the combination error indication 415 via a pin 405 that is distinct from the data channel 490, in some cases, the memory device may instead transmit the combination error indication 415 via a pin 405 that is associated with (e.g., included in) the data channel 490. For example, the combination error indication 415 may be sent using a data channel 490 prior to or subsequent to the data 410.

The memory device may additionally transmit signaling indicating a master error flag 420 and the error control information 425 to the host device via the pin 405. For example, the memory device may transmit one or more repetition of the master error flag 420 indicating whether the memory device detects any errors (e.g., associated with a vendor associated with the memory device) during an execution of the read operation. Additionally, the memory device may transmit the error control information 425 to the host device via the pin 405. In some cases, the error control information 425 may correspond to link error control information.

Figure 5:
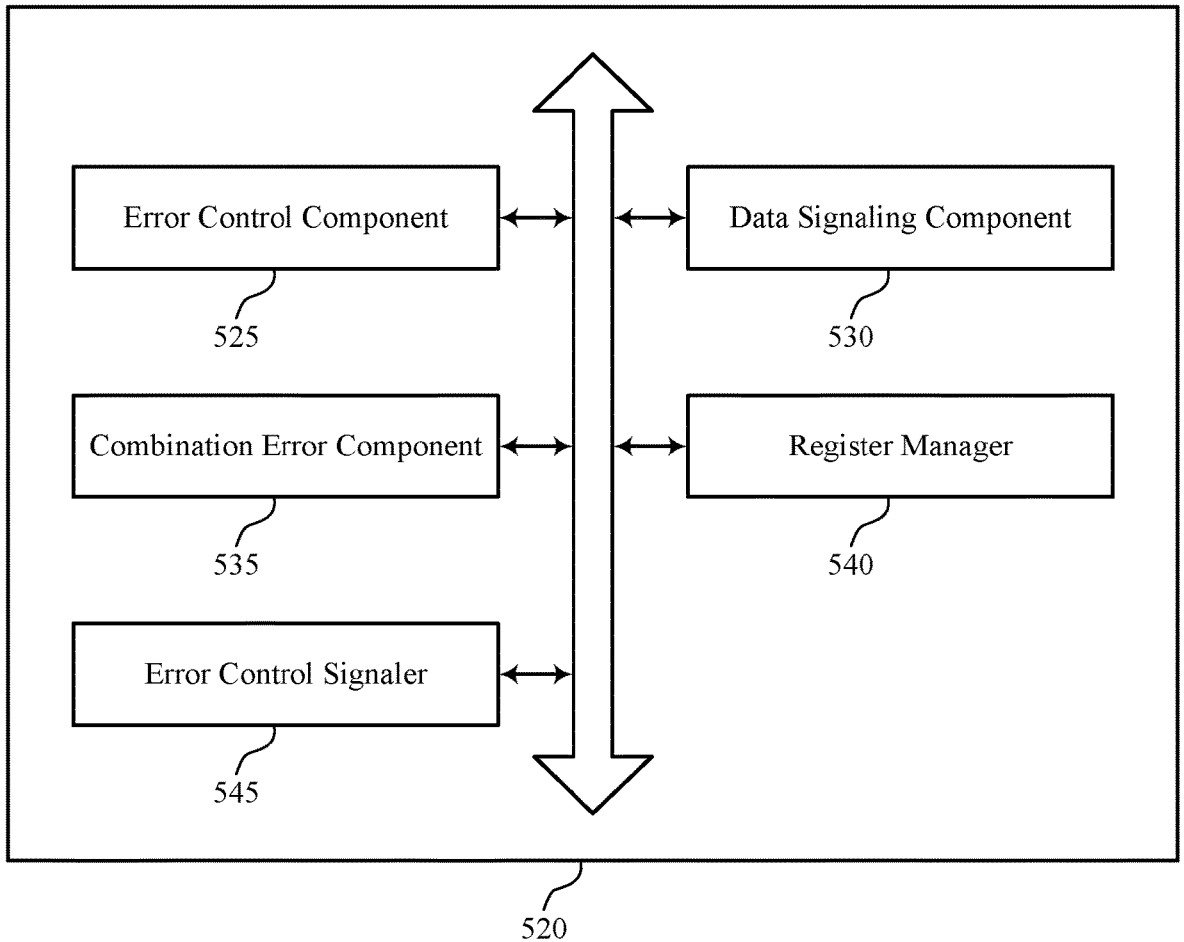
FIG. 5 shows a block diagram of a memory device that supports efficient error signaling by memory in accordance with examples as disclosed herein.

FIG. 5 shows a block diagram 500 of a memory device 520 that supports efficient error signaling by memory in accordance with examples as disclosed herein. The memory device 520 may be an example of aspects of a memory device as described with reference to FIGS. 1 through 4. The memory device 520, or various components thereof, may be an example of means for performing various aspects of efficient error signaling by memory as described herein. For example, the memory device 520 may include an error control component 525, a data signaling component 530, a combination error component 535, a register manager 540, an error control signaler 545, or any combination thereof. Each of these components may communicate, directly or indirectly, with one another (e.g., via one or more buses).

The error control component 525 may be configured as or otherwise support a means for performing, by a memory device based at least in part on executing a read operation, an error control operation to detect one or more errors in data associated with the read operation. The data signaling component 530 may be configured as or otherwise support a means for transmitting, by the memory device, first signaling indicating the data associated with the read operation based at least in part on performing the error control operation. The combination error component 535 may be configured as or otherwise support a means for transmitting, by the memory device, second signaling including an indicator of a combination error having two values, where a first value of the indicator indicates one or more errors detected in the data during the error control operation or a non-driven condition for the first signaling, and where a second value of the indicator indicates that the read operation has been executed and that no errors were detected in the data during the error control operation.

The register manager 540 may be configured as or otherwise support a means for storing a third value in a register at a memory device based at least in part on transmitting the second signaling including the first value of the indicator. In some examples, the third value may indicate whether the combination error includes: the one or more errors detected in the data during the error control operation and the non-driven condition for the first signaling. In some examples, the one or more errors detected in the data during the error control operation and that the read operation has been executed, or an absence of the one or more errors detected in the data during the error control operation and the non-driven condition for the first signaling.

In some examples, to support transmitting the second signaling including the first value of the indicator, the combination error component 535 may be configured as or otherwise support a means for outputting a first voltage level over a pin of the memory device, where the first voltage level corresponds to a level of a termination of the pin. In some other examples, to support transmitting the second signaling including the second value of the indicator, the combination error component 535 may be configured as or otherwise support a means for outputting a second voltage level over the pin that is different from the first voltage level.

In some examples, in an idle state, the pin is not driven to the first voltage level or the second voltage level.

In some examples, to support transmitting the second signaling including the indicator, the combination error component 535 may be configured as or otherwise support a means for transmitting the second signaling including the indicator of the combination error using a single cycle of the first signaling.

In some examples, to support transmitting the second signaling including the indicator, the combination error component 535 may be configured as or otherwise support a means for transmitting the second signaling including the indicator of the combination error using a plurality of cycles of the first signaling.

In some examples, to support transmitting the first signaling, the data signaling component 530 may be configured as or otherwise support a means for transmitting the first signaling via one or more first pins of a memory device. In some examples, to support transmitting the second signaling, the combination error component 535 may be configured as or otherwise support a means for transmitting the second signaling via one or more second pins of the memory device, the one or more second pins different from the one or more first pins.

In some examples, the error control component 525 may be configured as or otherwise support a means for generating, based at least in part on performing the error control operation, error control information associated with the data. In some examples, the error control signaler 545 may be configured as or otherwise support a means for transmitting, via the one or more second pins at the memory device, third signaling indicating the error control information associated with the data.

In some examples, to support transmitting the first signaling, the data signaling component 530 may be configured as or otherwise support a means for transmitting the first signaling via one or more pins at a memory device. In some examples, to support transmitting the second signaling, the combination error component 535 may be configured as or otherwise support a means for transmitting the second signaling via the one or more pins at the memory device.

Figure 6:
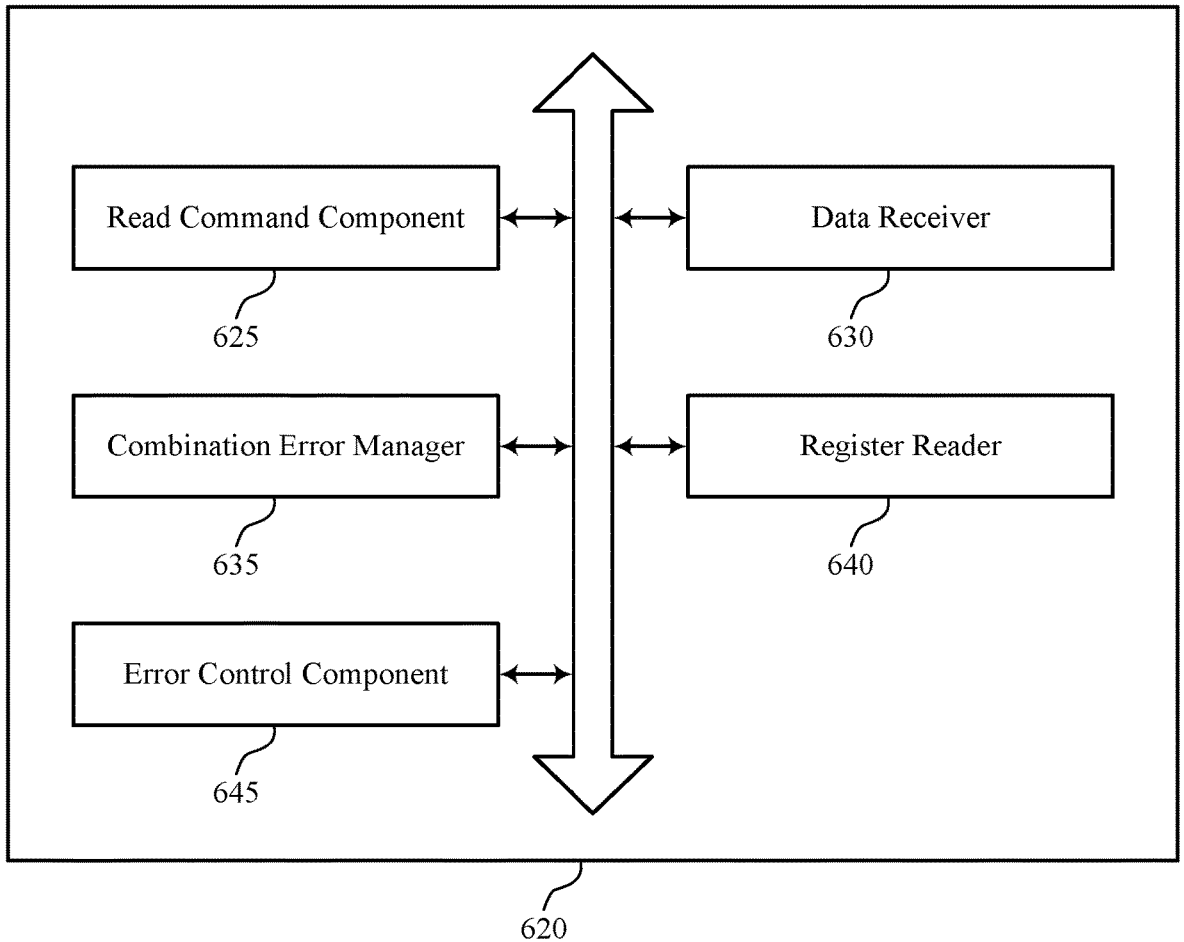
FIG. 6 shows a block diagram of a host device that supports efficient error signaling by memory in accordance with examples as disclosed herein.

FIG. 6 shows a block diagram 600 of a host device 620 that supports efficient error signaling by memory in accordance with examples as disclosed herein. The host device 620 may be an example of aspects of a host device as described with reference to FIGS. 1 through 4. The host device 620, or various components thereof, may be an example of means for performing various aspects of efficient error signaling by memory as described herein. For example, the host device 620 may include a read command component 625, a data receiver 630, a combination error manager 635, a register reader 640, an error control component 645, or any combination thereof. Each of these components may communicate, directly or indirectly, with one another (e.g., via one or more buses).

The read command component 625 may be configured as or otherwise support a means for transmitting a read command to a memory device. The data receiver 630 may be configured as or otherwise support a means for receiving, from the memory device, first signaling indicating data associated with the read command. The combination error manager 635 may be configured as or otherwise support a means for receiving, from the memory device, second signaling including an indicator of a combination error having two values, where a first value of the indicator indicates one or more errors detected in the data during an error control operation at the memory device or a non-driven condition for the first signaling, and where a second value of the indicator indicates that the memory device has executed the read command and that no errors were detected in the data during the error control operation.

In some examples, the register reader 640 may be configured as or otherwise support a means for reading, based at least in part on the second signaling including the first value of the indicator, a third value from a register at the memory device, the third value indicating whether the combination error includes: the one or more errors detected in the data during the error control operation and the non-driven condition for the first signaling, the one or more errors detected in the data during the error control operation and that the memory device has executed the read command, or an absence of the one or more errors detected in the data during the error control operation and the non-driven condition for the first signaling.

In some examples, to support receiving the second signaling including the first value of the indicator, the combination error manager 635 may be configured as or otherwise support a means for receiving a first voltage level over a channel coupled with a pin of the memory device, where the first voltage level corresponds to a level of a termination of the pin. In some examples, to support receiving the second signaling including the second value of the indicator, the combination error manager 635 may be configured as or otherwise support a means for receiving a second voltage level over the channel that is different from the first voltage level.

In some examples, to support receiving the second signaling including the indicator, the combination error manager 635 may be configured as or otherwise support a means for receiving the second signaling including the indicator of the combination error using a single cycle of the first signaling.

In some examples, to support receiving the second signaling including the first value or the second value, the combination error manager 635 may be configured as or otherwise support a means for receiving the second signaling including the indicator of the combination error using a plurality of cycles of the first signaling.

In some examples, to support receiving the first signaling, the data receiver 630 may be configured as or otherwise support a means for receiving the first signaling via one or more first channels coupled to one or more first pins at the memory device. In some examples, to support receiving the second signaling, the combination error manager 635 may be configured as or otherwise support a means for receiving the second signaling via one or more second channels coupled to one or more second pins at the memory device, the one or more second pins different from the one or more first pins.

In some examples, the error control component 645 may be configured as or otherwise support a means for receiving, via the one or more second pins at the memory device, third signaling indicating error control information associated with the data. In some examples, the error control component 645 may be configured as or otherwise support a means for performing an error control operation to detect one or more errors in the data based at least in part on the error control information.

In some examples, to support receiving the first signaling, the data receiver 630 may be configured as or otherwise support a means for receiving the first signaling via one or more channels coupled with one or more pins at the memory device. In some examples, to support receiving the second signaling, the combination error manager 635 may be configured as or otherwise support a means for receiving the second signaling via the one or more channels.

Figure 7:
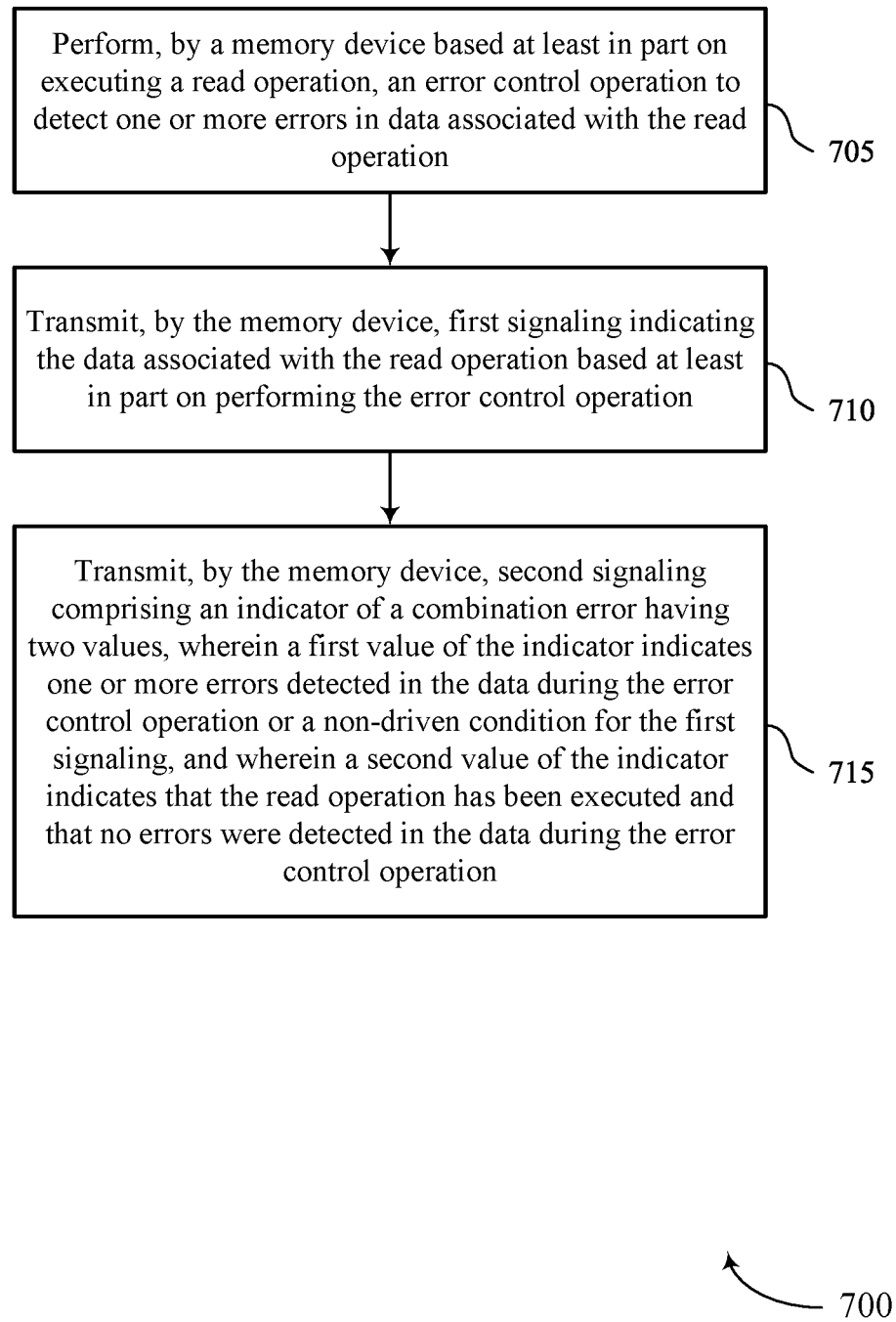
FIGS. 7 and 8 show flowcharts illustrating a method or methods that support efficient error signaling by memory in accordance with examples as disclosed herein.

FIG. 7 shows a flowchart illustrating a method 700 that supports efficient error signaling by memory in accordance with examples as disclosed herein. The operations of method 700 may be implemented by a memory device or its components as described herein. For example, the operations of method 700 may be performed by a memory device as described with reference to FIGS. 1 through 5. In some examples, a memory device may execute a set of instructions to control the functional elements of the device to perform the described functions. Additionally, or alternatively, the memory device may perform aspects of the described functions using special-purpose hardware.

At 705, the method may include performing, by a memory device based at least in part on executing a read operation, an error control operation to detect one or more errors in data associated with the read operation. The operations of 705 may be performed in accordance with examples as disclosed herein. In some examples, aspects of the operations of 705 may be performed by an error control component 525 as described with reference to FIG. 5.

At 710, the method may include transmitting, by the memory device, first signaling indicating the data associated with the read operation based at least in part on performing the error control operation. The operations of 710 may be performed in accordance with examples as disclosed herein. In some examples, aspects of the operations of 710 may be performed by a data signaling component 530 as described with reference to FIG. 5.

At 715, the method may include transmitting, by the memory device, second signaling including an indicator of a combination error having two values, where a first value of the indicator indicates one or more errors detected in the data during the error control operation or a non-driven condition for the first signaling, and where a second value of the indicator indicates that the read operation has been executed and that no errors were detected in the data during the error control operation. The operations of 715 may be performed in accordance with examples as disclosed herein. In some examples, aspects of the operations of 715 may be performed by a combination error component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for performing, by a memory device based at least in part on executing a read operation, an error control operation to detect one or more errors in data associated with the read operation; transmitting, by the memory device, first signaling indicating the data associated with the read operation based at least in part on performing the error control operation; and transmitting, by the memory device, second signaling including an indicator of a combination error having two values, where a first value of the indicator indicates one or more errors detected in the data during the error control operation or a non-driven condition for the first signaling, and where a second value of the indicator indicates that the read operation has been executed and that no errors were detected in the data during the error control operation.

Aspect 2: The method, apparatus, or non-transitory computer-readable medium of aspect 1, where storing a third value in a register at a memory device based at least in part on transmitting the second signaling including the first value of the indicator, the third value indicating whether the combination error includes; the one or more errors detected in the data during the error control operation and the non-driven condition for the first signaling; the one or more errors detected in the data during the error control operation and that the read operation has been executed; or an absence of the one or more errors detected in the data during the error control operation and the non-driven condition for the first signaling.

Aspect 3: The method, apparatus, or non-transitory computer-readable medium of any of aspects 1 through 2, where transmitting the second signaling including the first value of the indicator includes outputting a first voltage level over a pin of the memory device, where the first voltage level corresponds to a level of a termination of the pin and transmitting the second signaling including the second value of the indicator includes outputting a second voltage level over the pin that is different from the first voltage level.

Aspect 4: The method, apparatus, or non-transitory computer-readable medium of aspect 3, where in an idle state, the pin is not driven to the first voltage level or the second voltage level.

Aspect 5: The method, apparatus, or non-transitory computer-readable medium of any of aspects 1 through 4, where transmitting the second signaling including the indicator includes operations, features, circuitry, logic, means, or instructions, or any combination thereof for transmitting the second signaling including the indicator of the combination error using a single cycle of the first signaling.

Aspect 6: The method, apparatus, or non-transitory computer-readable medium of aspect 5, where transmitting the second signaling including the indicator further includes operations, features, circuitry, logic, means, or instructions, or any combination thereof for transmitting the second signaling including the indicator of the combination error using a plurality of cycles of the first signaling.

Aspect 7: The method, apparatus, or non-transitory computer-readable medium of any of aspects 1 through 6, where transmitting the first signaling includes transmitting the first signaling via one or more first pins of a memory device and transmitting the second signaling includes transmitting the second signaling via one or more second pins of the memory device, the one or more second pins different from the one or more first pins.

Aspect 8: The method, apparatus, or non-transitory computer-readable medium of aspect 7, further including operations, features, circuitry, logic, means, or instructions, or any combination thereof for generating, based at least in part on performing the error control operation, error control information associated with the data and transmitting, via the one or more second pins at the memory device, third signaling indicating the error control information associated with the data.

Aspect 9: The method, apparatus, or non-transitory computer-readable medium of any of aspects 1 through 6, where transmitting the first signaling includes transmitting the first signaling via one or more pins at a memory device and transmitting the second signaling includes transmitting the second signaling via the one or more pins at the memory device.

Figure 8:
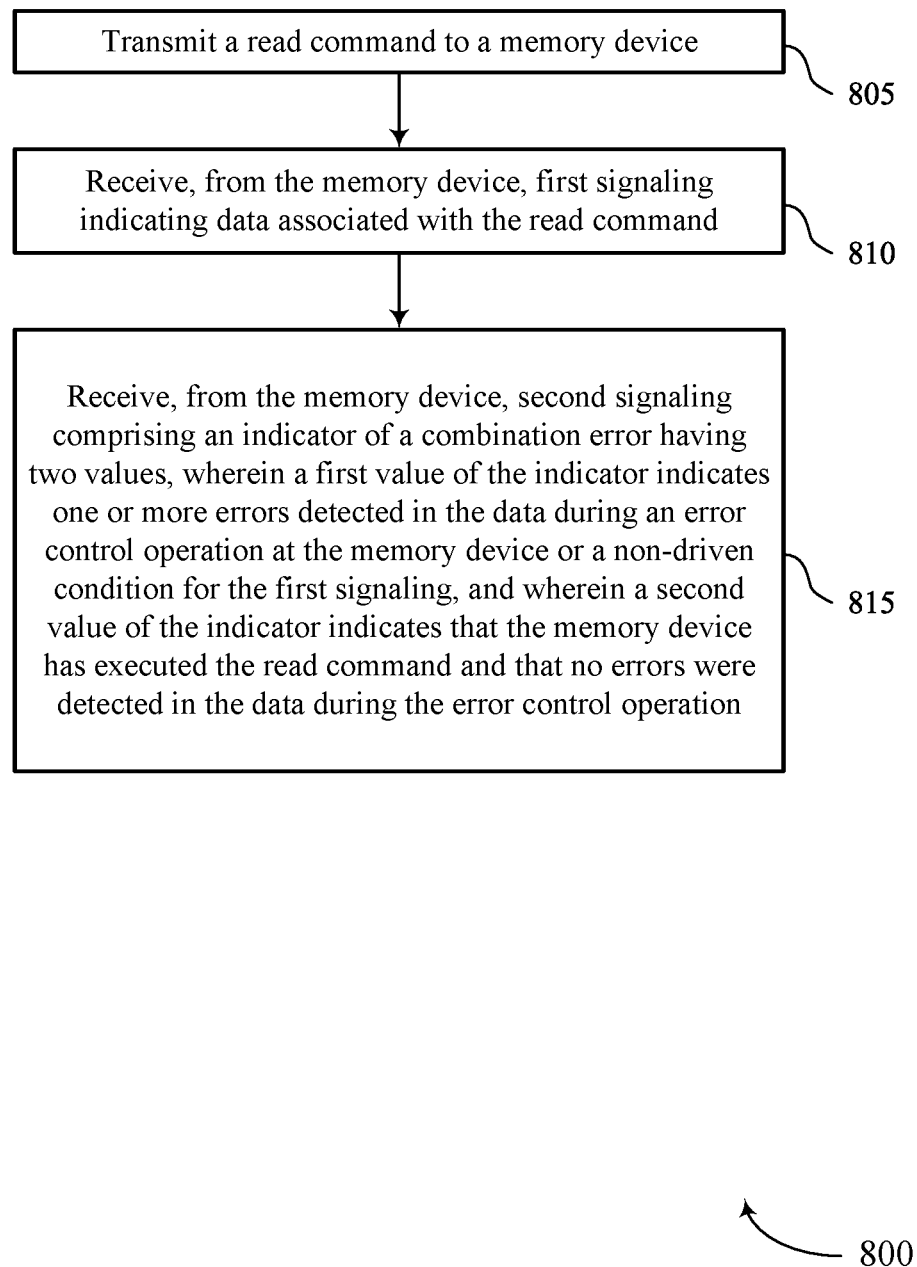

FIG. 8 shows a flowchart illustrating a method 800 that supports efficient error signaling by memory in accordance with examples as disclosed herein. The operations of method 800 may be implemented by a host device or its components as described herein. For example, the operations of method 800 may be performed by a host device as described with reference to FIGS. 1 through 4 and 6. In some examples, a host device may execute a set of instructions to control the functional elements of the device to perform the described functions. Additionally, or alternatively, the host device may perform aspects of the described functions using special-purpose hardware.

At 805, the method may include transmitting a read command to a memory device. The operations of 805 may be performed in accordance with examples as disclosed herein. In some examples, aspects of the operations of 805 may be performed by a read command component 625 as described with reference to FIG. 6.

At 810, the method may include receiving, from the memory device, first signaling indicating data associated with the read command. The operations of 810 may be performed in accordance with examples as disclosed herein. In some examples, aspects of the operations of 810 may be performed by a data receiver 630 as described with reference to FIG. 6.

At 815, the method may include receiving, from the memory device, second signaling including an indicator of a combination error having two values, where a first value of the indicator indicates one or more errors detected in the data during an error control operation at the memory device or a non-driven condition for the first signaling, and where a second value of the indicator indicates that the memory device has executed the read command and that no errors were detected in the data during the error control operation. The operations of 815 may be performed in accordance with examples as disclosed herein. In some examples, aspects of the operations of 815 may be performed by a combination error manager 635 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 10: A method, apparatus, or non-transitory computer-readable medium including operations, features, circuitry, logic, means, or instructions, or any combination thereof for transmitting a read command to a memory device; receiving, from the memory device, first signaling indicating data associated with the read command; and receiving, from the memory device, second signaling including an indicator of a combination error having two values, where a first value of the indicator indicates one or more errors detected in the data during an error control operation at the memory device or a non-driven condition for the first signaling, and where a second value of the indicator indicates that the memory device has executed the read command and that no errors were detected in the data during the error control operation.

Aspect 11: The method, apparatus, or non-transitory computer-readable medium of aspect 10, further including operations, features, circuitry, logic, means, or instructions, or any combination thereof for reading, based at least in part on the second signaling including the first value of the indicator, a third value from a register at the memory device, the third value indicating whether the combination error includes; the one or more errors detected in the data during the error control operation and the non-driven condition for the first signaling; the one or more errors detected in the data during the error control operation and that the memory device has executed the read command; and an absence of the one or more errors detected in the data during the error control operation and the non-driven condition for the first signaling.

Aspect 12: The method, apparatus, or non-transitory computer-readable medium of any of aspects 10 through 11, where receiving the second signaling including the first value of the indicator includes receiving a first voltage level over a channel coupled with a pin of the memory device, where the first voltage level corresponds to a level of a termination of the pin and receiving the second signaling including the second value of the indicator includes receiving a second voltage level over the channel that is different from the first voltage level.

Aspect 13: The method, apparatus, or non-transitory computer-readable medium of any of aspects 10 through 12, where receiving the second signaling including the indicator includes operations, features, circuitry, logic, means, or instructions, or any combination thereof for receiving the second signaling including the indicator of the combination error using a single cycle of the first signaling.

Aspect 14: The method, apparatus, or non-transitory computer-readable medium of any of aspects 10 through 13, where receiving the second signaling including the first value or the second value further includes operations, features, circuitry, logic, means, or instructions, or any combination thereof for receiving the second signaling including the indicator of the combination error using a plurality of cycles of the first signaling.

Aspect 15: The method, apparatus, or non-transitory computer-readable medium of any of aspects 10 through 14, where receiving the first signaling includes receiving the first signaling via one or more first channels coupled to one or more first pins at the memory device and receiving the second signaling includes receiving the second signaling via one or more second channels coupled to one or more second pins at the memory device, the one or more second pins different from the one or more first pins.

Aspect 16: The method, apparatus, or non-transitory computer-readable medium of aspect 15, further including operations, features, circuitry, logic, means, or instructions, or any combination thereof for receiving, via the one or more second pins at the memory device, third signaling indicating error control information associated with the data and performing an error control operation to detect one or more errors in the data based at least in part on the error control information.

Aspect 17: The method, apparatus, or non-transitory computer-readable medium of any of aspects 10 through 14, where receiving the first signaling includes receiving the first signaling via one or more channels coupled with one or more pins at the memory device and receiving the second signaling includes receiving the second signaling via the one or more channels.

It should be noted that the methods described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   performing, by a memory device based at least in part on executing a read operation, an error control operation to detect one or more errors in data associated with the read operation;
   transmitting, to a host device and by the memory device, first signaling indicating the data associated with the read operation based at least in part on performing the error control operation; and
   transmitting, to the host device and by the memory device, second signaling comprising an indicator of a combination error having two values, wherein a first value of the indicator indicates one or more errors detected in the data during the error control operation or a non-driven condition for the first signaling, and wherein a second value of the indicator indicates that the read operation has been executed and that no errors were detected in the data during the error control operation.

2. The method of claim 1, wherein:
   storing a third value in a register at the memory device based at least in part on transmitting the second signaling comprising the first value of the indicator, the third value indicating whether the combination error comprises:
   the one or more errors detected in the data during the error control operation and the non-driven condition for the first signaling;
   the one or more errors detected in the data during the error control operation and that the read operation has been executed; or
   an absence of the one or more errors detected in the data during the error control operation and the non-driven condition for the first signaling.

3. The method of claim 1, wherein:
   transmitting the second signaling comprising the first value of the indicator comprises outputting a first voltage level over a pin of the memory device, wherein the first voltage level corresponds to a level of a termination voltage of the pin; and
   transmitting the second signaling comprising the second value of the indicator comprises outputting a second voltage level over the pin that is different from the first voltage level.

4. The method of claim 3, wherein in an idle state, the pin is not driven to the first voltage level or the second voltage level.

5. The method of claim 1, wherein transmitting the second signaling comprising the indicator comprises:
   transmitting the second signaling comprising the indicator of the combination error using a single cycle of the first signaling.

6. The method of claim 5, wherein transmitting the second signaling comprising the indicator further comprises:
   transmitting the second signaling comprising the indicator of the combination error using a plurality of cycles of the first signaling.

7. The method of claim 1, wherein:
   transmitting the first signaling comprises transmitting the first signaling via one or more first pins of the memory device; and
   transmitting the second signaling comprises transmitting the second signaling via one or more second pins of the memory device, the one or more second pins different from the one or more first pins.

8. The method of claim 7, further comprising:
generating, based at least in part on performing the error control operation, error control information associated with the data; and
transmitting, via the one or more second pins at the memory device, third signaling indicating the error control information associated with the data.

9. The method of claim 1, wherein:
transmitting the first signaling comprises transmitting the first signaling via one or more pins at the memory device; and
transmitting the second signaling comprises transmitting the second signaling via the one or more pins at the memory device.

10. A method, comprising:
transmitting a read command to a memory device;
receiving, by a host device and from the memory device, first signaling indicating data associated with the read command; and
receiving, by the host device and from the memory device, second signaling comprising an indicator of a combination error having two values, wherein a first value of the indicator indicates one or more errors detected in the data during an error control operation at the memory device or a non-driven condition for the first signaling, and wherein a second value of the indicator indicates that the memory device has executed the read command and that no errors were detected in the data during the error control operation.

11. The method of claim 10, further comprising:
reading, based at least in part on the second signaling comprising the first value of the indicator, a third value from a register at the memory device, the third value indicating whether the combination error comprises:
the one or more errors detected in the data during the error control operation and the non-driven condition for the first signaling;
the one or more errors detected in the data during the error control operation and that the memory device has executed the read command; or
an absence of the one or more errors detected in the data during the error control operation and the non-driven condition for the first signaling.

12. The method of claim 10, wherein:
receiving the second signaling comprising the first value of the indicator comprises receiving a first voltage level over a channel coupled with a pin of the memory device, wherein the first voltage level corresponds to a level of a termination voltage of the pin; and
receiving the second signaling comprising the second value of the indicator comprises receiving a second voltage level over the channel that is different from the first voltage level.

13. The method of claim 10, wherein receiving the second signaling comprising the indicator comprises:
receiving the second signaling comprising the indicator of the combination error using a single cycle of the first signaling.

14. The method of claim 10, wherein receiving the second signaling comprising the first value or the second value further comprises:
receiving the second signaling comprising the indicator of the combination error using a plurality of cycles of the first signaling.

15. The method of claim 10, wherein:
receiving the first signaling comprises receiving the first signaling via one or more first channels coupled to one or more first pins at the memory device; and
receiving the second signaling comprises receiving the second signaling via one or more second channels coupled to one or more second pins at the memory device, the one or more second pins different from the one or more first pins.

16. The method of claim 15, further comprising:
receiving, via the one or more second pins at the memory device, third signaling indicating error control information associated with the data; and
performing the error control operation to detect the one or more errors in the data based at least in part on the error control information.

17. The method of claim 10, wherein:
receiving the first signaling comprises receiving the first signaling via one or more channels coupled with one or more pins at the memory device; and
receiving the second signaling comprises receiving the second signaling via the one or more channels.

18. An apparatus, comprising:
a memory array;
error control circuitry coupled with the memory array and configured to perform an error control operation to detect one or more errors in data associated with a read operation; and
a controller coupled with the memory array and the error control circuitry, the controller configured to cause the apparatus to:
transmit, to a host device, first signaling indicating the data associated with the read operation based at least in part on performing the error control operation; and
transmit, to the host device, second signaling comprising an indicator of a combination error having two values, wherein a first value of the indicator indicates one or more errors detected in the data during the error control operation or a non-driven condition for the first signaling, and wherein a second value of the indicator indicates that the read operation has been executed and that no errors were detected in the data during the error control operation.

19. The apparatus of claim 18, further comprising:
a register coupled with the controller, wherein the controller is further configured to cause the apparatus to store a third value in the register based at least in part on transmitting the second signaling comprising the first value of the indicator, the third value indicating whether the combination error comprises:
the one or more errors detected in the data during the error control operation and the non-driven condition for the first signaling;
the one or more errors detected in the data during the error control operation and that the read operation has been executed; or
an absence of the one or more errors detected in the data during the error control operation and the non-driven condition for the first signaling.

20. The apparatus of claim 18, wherein:
to transmit the second signaling comprising the first value of the indicator, the controller is configured to cause the apparatus to output a first voltage level over a pin of the apparatus, wherein the first voltage level corresponds to a level of a termination voltage of the pin; and
to transmit the second signaling comprising the second value of the indicator, the controller is configured to cause the apparatus to output a second voltage level over the pin that is different from the first voltage level.

21. The apparatus of claim 18, wherein to transmit the second signaling comprising the indicator, the controller is configured to cause the apparatus to:
transmit the second signaling comprising the indicator of the combination error using a single cycle of the first signaling.

22. An apparatus, comprising:
a controller associated with a memory device, wherein the controller is configured to cause the apparatus to:
transmit a read command to the memory device;
receive, by a host device and from the memory device, first signaling indicating data associated with the read command; and
receive, by the host device and from the memory device, second signaling comprising an indicator of a combination error having two values, wherein a first value of the indicator indicates one or more errors detected in the data during an error control operation at the memory device or a non-driven condition for the first signaling, and wherein a second value of the indicator indicates that the memory device has executed the read command and that no errors were detected in the data during the error control operation.

23. The apparatus of claim 22, wherein the controller is further configured to cause the apparatus to:
read, based at least in part on the second signaling comprising the first value of the indicator, a third value from a register at the memory device, the third value indicating whether the combination error comprises:
the one or more errors detect in the data during the error control operation and the non-driven condition for the first signaling;
the one or more errors detect in the data during the error control operation and that the memory device has executed the read command; or
an absence of the one or more errors detect in the data during the error control operation and the non-driven condition for the first signaling.

24. The apparatus of claim 22, further comprising:
receiving the second signaling comprising the first value of the indicator comprises receiving a first voltage level over a channel coupled with a pin of the memory device, wherein the first voltage level corresponds to a level of a termination voltage of the pin; and
receiving the second signaling comprising the second value of the indicator comprises receiving a second voltage level over the channel that is different from the first voltage level.

25. The apparatus of claim 22, wherein receiving the second signaling comprising the indicator is configured to cause the apparatus to:
receive the second signaling comprising the indicator of the combination error using a single cycle of the first signaling.

\* \* \* \* \*